United States Patent
Davis et al.

(10) Patent No.: US 8,919,213 B2
(45) Date of Patent: Dec. 30, 2014

(54) CONTROL MOMENT GYROSCOPES INCLUDING ROTORS HAVING RADIALLY-COMPLIANT SPOKES AND METHODS FOR THE MANUFACTURE THEREOF

(75) Inventors: Porter Davis, Phoenix, AZ (US); Carlos J. Stevens, Peoria, AZ (US)

(73) Assignee: Honeywell International Inc., Morristown, NJ (US)

(*) Notice: Subject to any disclaimer, the term of this patent is extended or adjusted under 35 U.S.C. 154(b) by 360 days.

(21) Appl. No.: 13/476,737

(22) Filed: May 21, 2012

(65) Prior Publication Data

US 2013/0305850 A1 Nov. 21, 2013

(51) Int. Cl.
- G01C 19/16 (2006.01)
- G01C 19/20 (2006.01)
- G01C 19/38 (2006.01)
- F16C 15/00 (2006.01)

(52) U.S. Cl.
USPC .......................................... 74/5.95; 74/5 R (58) Field of Classification Search
CPC ........ G01C 19/06; G01C 25/00; G01C 19/04; G01C 19/16; B23P 11/00; B23P 13/00; B23P 13/02
USPC .................. 74/5 R, 5.7, 5.95, 572.2, 572.21; 29/557, 596, 598, 893.344
See application file for complete search history.

(56) References Cited

U.S. PATENT DOCUMENTS

| | | | |
|---|---|---|---|
| 1,418,330 A * | 6/1922 | Schein | ......................... 74/574.4 |
| 2,075,797 A | 4/1937 | Blair | |
| 2,091,888 A | 8/1937 | Schmidt | |
| 2,244,603 A | 6/1941 | Bauer | |
| 2,413,285 A | 12/1946 | Bousky | |
| 2,940,318 A | 6/1960 | Adams et al. | |
| 2,969,682 A | 1/1961 | Schoeppel et al. | |
| 3,242,742 A | 3/1966 | Parker | |

(Continued)

FOREIGN PATENT DOCUMENTS

| | | |
|---|---|---|
| EP | 2088080 A1 | 8/2009 |
| GB | 147271 | 7/1920 |

(Continued)

OTHER PUBLICATIONS

Hind, C.; Hind Musical Instruments; http://hindocarina.com/about/gyroscope, Feb. 20, 2012.

(Continued)

*Primary Examiner* — William Kelleher
*Assistant Examiner* — Jake Cook
(74) *Attorney, Agent, or Firm* — Ingrassia Fisher & Lorenz, P.C.

(57) ABSTRACT

A control moment gyroscope (CMG) includes a stator housing, an inner gimbal assembly (IGA), and a torque motor coupled to the stator housing and configured to rotate the IGA housing about a gimbal axis to selectively generate a desired output torque during operation of the CMG. The IGA includes, in turn, an IGA housing rotatably coupled to the stator housing, a CMG rotor rotatably mounted within the IGA housing, and a spin motor coupled to the IGA housing and configured to rotate the CMG rotor about a spin axis. The CMG rotor includes a rotor shaft, a rotor rim circumscribing the rotor shaft, and a plurality of radially-compliant spokes extending between the rotor shaft and the rotor rim.

19 Claims, 6 Drawing Sheets

(56) References Cited

U.S. PATENT DOCUMENTS

| | | | |
|---|---|---|---|
| 3,322,986 | A | 5/1967 | Benatti et al. |
| 3,664,199 | A | 5/1972 | Lahde |
| 3,702,568 | A | 11/1972 | Howe |
| 3,719,092 | A * | 3/1973 | Quinby ............................ 74/5 R |
| 3,742,769 | A | 7/1973 | Crutcher et al. |
| 3,880,606 | A | 4/1975 | Boltinghouse et al. |
| 4,030,371 | A | 6/1977 | Bulman et al. |
| 4,257,280 | A | 3/1981 | Coles et al. |
| 4,343,203 | A * | 8/1982 | Jacobson et al. ................ 74/5 R |
| 4,438,655 | A | 3/1984 | Quermann |
| 4,487,083 | A | 12/1984 | Quermann |
| 4,499,778 | A | 2/1985 | Westhaver et al. |
| 4,618,791 | A | 10/1986 | Morrill et al. |
| 4,644,793 | A | 2/1987 | Church |
| 4,655,096 | A * | 4/1987 | Westhaver et al. .............. 74/5 F |
| 5,020,911 | A | 6/1991 | Gauert et al. |
| 5,474,263 | A | 12/1995 | Ford et al. |
| 5,535,902 | A | 7/1996 | Greiff |
| 5,555,765 | A | 9/1996 | Greiff |
| 5,650,568 | A | 7/1997 | Greiff et al. |
| 5,723,923 | A | 3/1998 | Clagett |
| 6,901,799 | B2 | 6/2005 | Chen et al. |
| 7,000,308 | B2 | 2/2006 | Fiske et al. |
| 7,314,225 | B2 | 1/2008 | Murnen et al. |
| 2003/0140479 | A1 | 7/2003 | Fiske et al. |
| 2004/0045399 | A1 * | 3/2004 | Hadi ............................... 74/574 |
| 2007/0069081 | A1 | 3/2007 | Roder et al. |
| 2010/0000349 | A1 * | 1/2010 | Stevens et al. ................... 74/5.4 |

FOREIGN PATENT DOCUMENTS

| | | |
|---|---|---|
| GB | 172557 | 12/1921 |
| GB | 418377 | 10/1934 |
| GB | 581891 | 10/1946 |
| GB | 838383 | 6/1960 |
| GB | 884061 A2 | 12/1961 |

OTHER PUBLICATIONS

Davis, P.; Momentum System Concepts and Trades for the New Class of Smaller Lower Cost Satellites, AAS 06-023, Feb. 4-8, 2006, Breckenridge, CO.

EP Search Report for application No. EP 13 165 670.4 dated Sep. 27, 2013.

EP examination report for application No. EP 13 165 670.4 dated Oct. 9, 2013.

* cited by examiner

CONTROL MOMENT GYROSCOPES INCLUDING ROTORS HAVING RADIALLY-COMPLIANT SPOKES AND METHODS FOR THE MANUFACTURE THEREOF

TECHNICAL FIELD

The present invention relates generally to momentum control devices and, more particularly, to control moment gyroscopes including rotors having radially-compliant spokes, as well as to methods for the manufacture thereof.

BACKGROUND

Control moment gyroscopes (CMGs) are commonly employed in satellite attitude control systems. A generalized CMG may include a main CMG housing and an inner gimbal assembly (IGA), which is mounted within the main CMG housing for rotation about a gimbal axis. The IGA includes, amongst other components, a rotor assembly, at least one spin motor, and a rotor support structure. In one known design commonly referred to as a "shell rotor architecture" or, more simply, a "shell rotor," the rotor assembly includes an annular rotor rim disposed between first and second hemi-spherical rotor shell pieces. The rotor rim is welded to the first and second rotor shell pieces along first and second circumferential rim-shell weld joints, respectively. Collectively, the rotor rim, the first rotor shell piece, and the second rotor shell piece form a generally spherical body having a central channel through which a rotor shaft extends. During operation, the spin motor rotates the rotor assembly about a spin axis at a relatively high rate of speed. The IGA is, in turn, selectively rotated about the gimbal axis, which is generally perpendicular to the rotor spin axis, by an actuator (e.g., a torque module assembly) mounted within the main CMG housing. When the IGA is "gimbaled" in this manner, a controlled torque is generated about an output axis normal to the spin and gimbal axes due to momentum transfer of the rotor assembly. This gyroscopic torque is imparted to the host satellite through a CMG mount interface, such as an annular flange bolted to the exterior of the satellite. By selectively rotating the IGA about the gimbal axis, the satellite's attitude may be adjusted and re-adjusted, as needed, in a highly controlled manner.

CMG shell rotors of the type described above have been developed and commercially implemented with considerable success by the assignee of the present Application, Honeywell International Inc. In general, CMG shell rotors provide superior performance characteristics as compared to other conventionally-known CMG rotors, including superior momentum-per-weight ratios and relatively high operational speed limits, as well as high angular stiffness. However, further improvements in momentum-per-weight ratios, speed capabilities, and other measures of CMG performance (e.g., operational lifespan) are still desirable. Moreover, as a notable disadvantage, the manufacturing schedule and costs associated with manufacture of CMGs having shell rotor-based architectures tend to be substantial. It is not uncommon for commercial production of a shell rotor to cost upwards of several hundred thousand U.S. dollars and to require over one year to complete.

It is thus desirable to provide CMGs including advanced rotors having improved performance characteristics (e.g., increased momentum-per-weight ratios, higher speed limits, longer operational lifespans, and so on) as compared to shell rotor assemblies and other conventionally-known CMG rotor assemblies. Ideally, embodiments of such a CMG, and specifically embodiments of the advanced rotor included within the CMG, would be amenable to production utilizing cost effective and time efficient manufacturing processes. It would also be desirable to provide manufacturing processes for producing CMGs including such high performance rotors. Other desirable features and characteristics of the present invention will become apparent from the subsequent Detailed Description and the appended claims, taken in conjunction with the accompanying drawings and this Background.

BRIEF SUMMARY

Embodiments of control moment gyroscopes (CMGs) are provided. In one embodiment, a CMG includes a stator housing, an inner gimbal assembly (IGA), and a torque motor coupled to the stator housing and configured to rotate the IGA housing about a gimbal axis to selectively generate a desired output torque during operation of the CMG. The IGA includes, in turn, an IGA housing rotatably coupled to the stator housing, a CMG rotor rotatably mounted within the IGA housing, and a spin motor coupled to the IGA housing and configured to rotate the CMG rotor about a spin axis. The CMG rotor includes a rotor shaft, a rotor rim circumscribing the rotor shaft, and a plurality of radially-compliant spokes extending between the rotor shaft and the rotor rim.

Method for manufacturing a control moment gyroscope (CMG) are further provided. In one embodiment, the method includes the steps of producing a monolithic CMG rotor, installing the monolithic CMG rotor within an inner gimbal assembly (IGA) including an IGA housing and a spin motor configured to rotate the monolithic CMG rotor relative to the IGA housing about a spin axis, and mounting the IGA to a stator assembly including a stator assembly housing and a torque motor configured to selectively rotate the IGA about a gimbal axis to selectively generate a desired output torque during operation of the CMG. The monolithic CMG rotor is produced to include a rotor shaft, a rotor rim circumscribing the rotor shaft, and a plurality of radially-compliant spokes extending between the rotor shaft and the rotor rim.

BRIEF DESCRIPTION OF THE DRAWINGS

At least one example of the present invention will hereinafter be described in conjunction with the following figures, wherein like numerals denote like elements, and.

For simplicity and clarity of illustration, the drawing figures illustrate the general manner of construction. Elements in the drawings figures are not necessarily drawn to scale. For example, the dimensions of some of the elements or regions in the figures may be exaggerated relative to other elements or regions to help improve understanding of embodiments of the invention. Descriptions and illustrations of well-known features and techniques may be omitted to avoid unnecessarily obscuring the invention.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
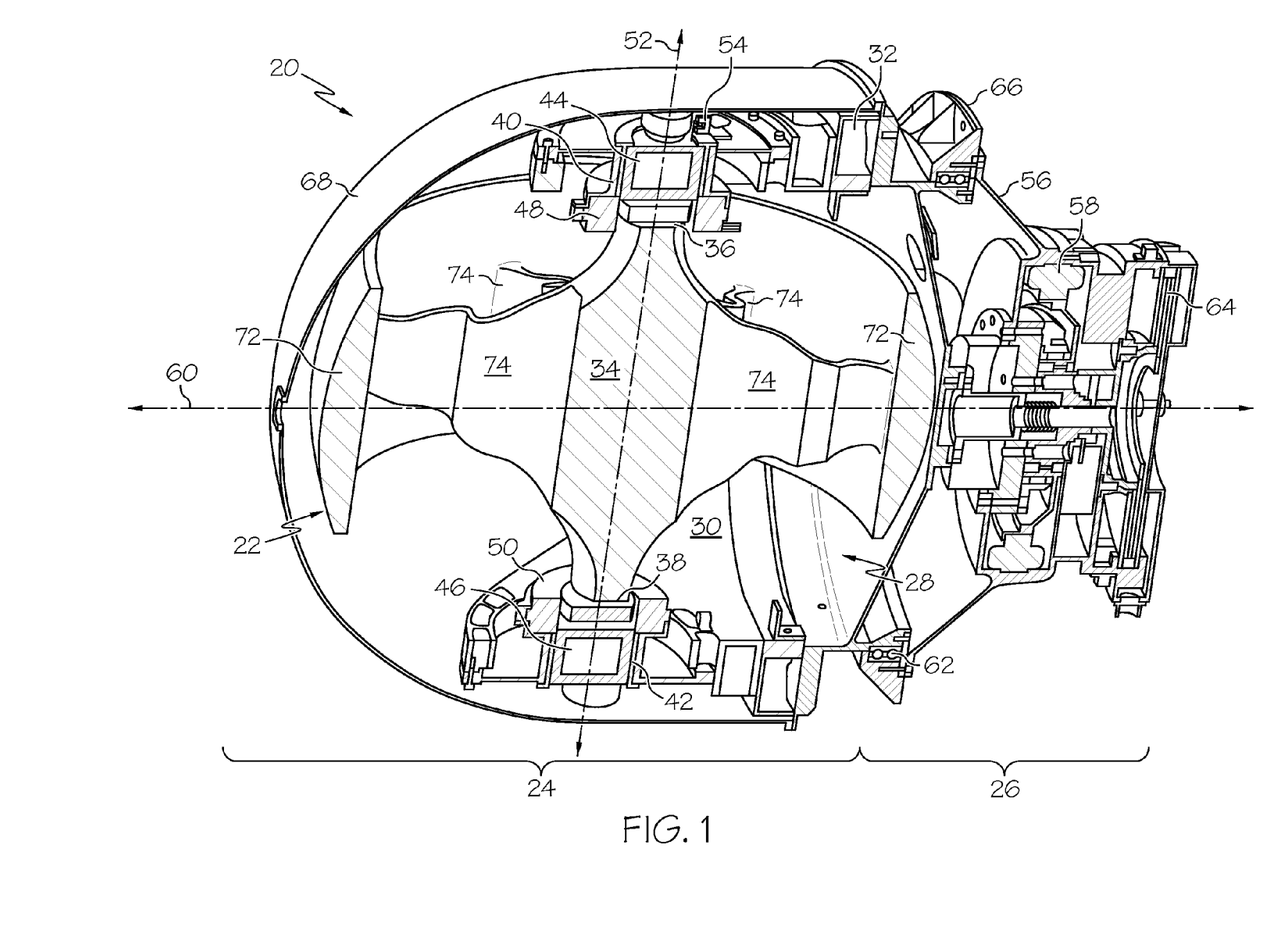
FIG. 1 is cross-sectional view of a control moment gyroscope including a high performance monolithic CMG rotor having a plurality of radially-compliant spokes, as illustrated in accordance with an exemplary embodiment of the present invention.

FIG. 1 is cross-sectional view of a control moment gyroscope (CMG) 20 including a high performance rotor 22 illustrated in accordance with an exemplary of the present invention. Rotor 22 is advantageously, although not necessarily, fabricated as a monolithic or unitary piece and will consequently be referred to as "monolithic CMG rotor 22" herein. Such a unitary or monolithic construction enables CMG rotor 22 to be produced with exceptional structural integrity due, at least in part, to the elimination of weld joints, which tend to fatigue at high torque duty cycles and prematurely limit the rotor's operational lifespan. The elimination of such weld joints or other mechanical attachment points allows monolithic CMG rotor 22 to operate at higher rotational speeds and greater torque loads thereby enhancing the performance aspects of CMG 20 (e.g., higher momentum-to-weight ratios), while reducing stress concentrations, overall mechanical fatigue, and increasing the rotor's operational longevity. Improvements in momentum-to-weight ratios and other measures of CMG performance are also achieved by fabricating CMG rotor 22 to include a number of radially extending rotor spokes each having a high angular or torsional stiffness, while also being relatively compliant, as taken in a radial direction from a location at which the spoke joins or meets the rotor shaft to a location at which the spoke joins or meets the rotor rim. As a still further advantage, monolithic CMG rotor 22, and thus CMG 20 as a whole, can be fabricated in a cost effective and relatively timely manner. Monolithic CMG rotor 22 is described in detail below in conjunction with FIGS. 2-4, a second exemplary CMG rotor 100 is described below in conjunction with FIG. 5, and an exemplary method 120 for manufacturing a monolithic CMG rotor, such as CMG rotor 22 (FIGS. 1-4) or CMG rotor 100 (FIG. 5), is described below in conjunction with FIG. 6. First, however, a general discussion of CMG 20 is provided to establish an exemplary, albeit non-limiting context in which exemplary CMG rotor 22 can be better understood.

Referring to the exemplary embodiment illustrated in FIG. 1, CMG 20 is comprised of two main assemblies, namely, an inner gimbal assembly (IGA) 24 and a stator assembly 26. Monolithic CMG rotor 22 is contained within IGA 24, which further includes a rotor support structure 28 to which CMG rotor 22 is rotatably mounted. Rotor support structure 28 can comprise any structural element or assemblage of structure elements suitable for supporting rotor 22 during CMG operation. In the illustrated example, rotor support structure 28 includes yoke or saddle structure 30, which is bolted or otherwise affixed to a base ring assembly 32. Base ring assembly 32 is, in turn, mounted to the housing of stator assembly 26 such that base ring assembly 32, and thus IGA 24 as a whole, can rotate with respect to stator assembly 26 about a gimbal axis (represented in FIG. 1 by dashed line 60, described below). As will be described more fully below in conjunction with FIGS. 2-4, monolithic CMG rotor 22 is fabricated to include a rotor shaft 34 having a fixed end 36 (the upper end of rotor shaft 34 in the orientation shown in FIG. 1) and an opposing floating end 38 (the lower end of shaft 34 in the illustrated orientation). Fixed end 36 of rotor shaft 34 is received within a first cylindrical cavity or annulus 40 provided within rotor support structure 28 and, specifically, within a first arm of saddle structure 30; while floating end 38 is received within a second annulus 42 provided within the opposing arm of saddle structure 30.

To facilitate high speed rotation of monolithic CMG rotor 22, a first spin bearing 44 (e.g., a fixed duplex bearing cartridge) is disposed within annulus 40 and positioned around fixed end 36 of rotor shaft 34. Similarly, a second spin bearing 46 (e.g., a floating duplex bearing cartridge) is disposed within annulus 42 and positioned around floating end 38 of rotor shaft 34. First and second spin motors 48 and 50 are further disposed around opposing ends of rotor shaft 34 (i.e., fixed end 36 and floating end 38, respectively) in a so-called "dual spin motor configuration." When energized, spin motors 48 and 50 rotate monolithic CMG rotor 22 about a spin axis (represented in FIG. 1 by dashed line 52) at a relatively high rate of speed, which may approach or exceed about 10,000 revolutions per minute, in an example. IGA 24 may further include various other components that are standard in the industry and not described in detail herein in the interests of concision, such as one or more heaters, vent valves, rotational sensors, and the like. For example, as illustrated in FIG. 1, IGA 24 may further be equipped with a tachometer assembly including a circuit card and an optical chopper 54 to monitor the rotational rate and/or the angular position of monolithic CMG rotor 22 during operation of CMG 20.

With continued reference to FIG. 1, stator assembly 26 includes a stator assembly housing 56 and a torque motor 58, which may be implemented as a torque module assembly. Stator assembly housing 56 supports rotor support structure 28 and, more generally, IGA 24. During the operation of CMG 20, torque motor 58 selectively rotates IGA 24 about a gimbal axis (represented in FIG. 1 by dashed line 60) orthogonal to spin axis 52. A gimbal bearing 62 (e.g., a large-bore duplex bearing) is disposed between stator assembly housing 56 and rotor support structure 28 to minimize friction as IGA 24 is rotated about gimbal axis 60. To detect the rotational rate and/or angular position of IGA 24, CMG 20 may be equipped with one or more sensors, such as a tachometer, a resolver, or the like. For example, as partially shown in FIG. 1, an optical rotary encoder 64 may be disposed within stator assembly housing 56 to monitor the rate and/or position of IGA 24. Although not shown in FIG. 1, CMG 20 may also include a slip ring assembly or other device (commonly implemented as a signal module assembly) suitable for transmitting electrical signals and/or power from electrical components mounted to stator assembly 26 or deployed onboard the host vehicle (e.g., a power source), across a rotary interface, and to the electrical components integrated into IGA 24 (e.g., spin motors 48 and 50); however, a signal module assembly need not be included in all embodiments and may be excluded in implementations wherein IGA 24 has relatively limited angle of rotation.

To permit CMG 20 to be mounted to a spacecraft (e.g., a satellite), an aircraft, or other vehicle, a mounting interface 66 is provided on the exterior of stator assembly housing 56. Mounting interface 66 may comprise, for example, an annular structure having a plurality of bolt apertures therethrough that may be bolted directly onto the wall of the host vehicle or, instead, bolted to an intermediary mounting structure that is, in turn, mounted to the vehicle. As noted above, to impart a desired torque to the host vehicle, torque motor 58 selectively rotates IGA 24, and thus rotor 22, about gimbal axis 60. Monolithic CMG rotor 22 (and particularly rotor rim 72 described below) is of sufficient mass and is spun a sufficiently high rotational rate during CMG operation that movement of rotor 22 out of its plane of rotation induces significant gyroscopic torque about an output axis normal to both spin axis 52 and gimbal axis 60. This output torque is transmitted from CMG rotor 22; through spin bearings 44 and 46, rotor support structure 28, gimbal bearing 62, and stator assembly housing 56; and to mounting interface 66 to impart a desired gyroscopic torque to the host vehicle and thereby perform highly controllable attitude adjustments.

In the exemplary embodiment illustrated in FIG. 1, stator assembly 26 is shown to include an IGA cover 68, which sealingly encloses the other components of IGA 24 and monolithic CMG rotor 22. IGA cover 68 permits near-vacuum conditions to be created within stator assembly 26 during the ground testing of CMG 20. In addition, IGA cover 68 provides a radiation thermal path for dissipating heat from monolithic CMG rotor 22 and the other components of IGA 24 (e.g., spin bearings 44 and 46). In embodiments wherein CMG 20 is deployed onboard a spacecraft, and in certain other embodiments, CMG 20 may not include IGA cover 68. However, if provided, IGA cover 68 is not required to support any additional components of CMG 20; nor is IGA cover 68 required to provide a path for transmitting. Thus, IGA cover 68 may be designed to be relatively thin-walled and to have a perfect or near perfect hemi-spherical shape to minimize the overall volume and weight of CMG 20.

Figure 2:
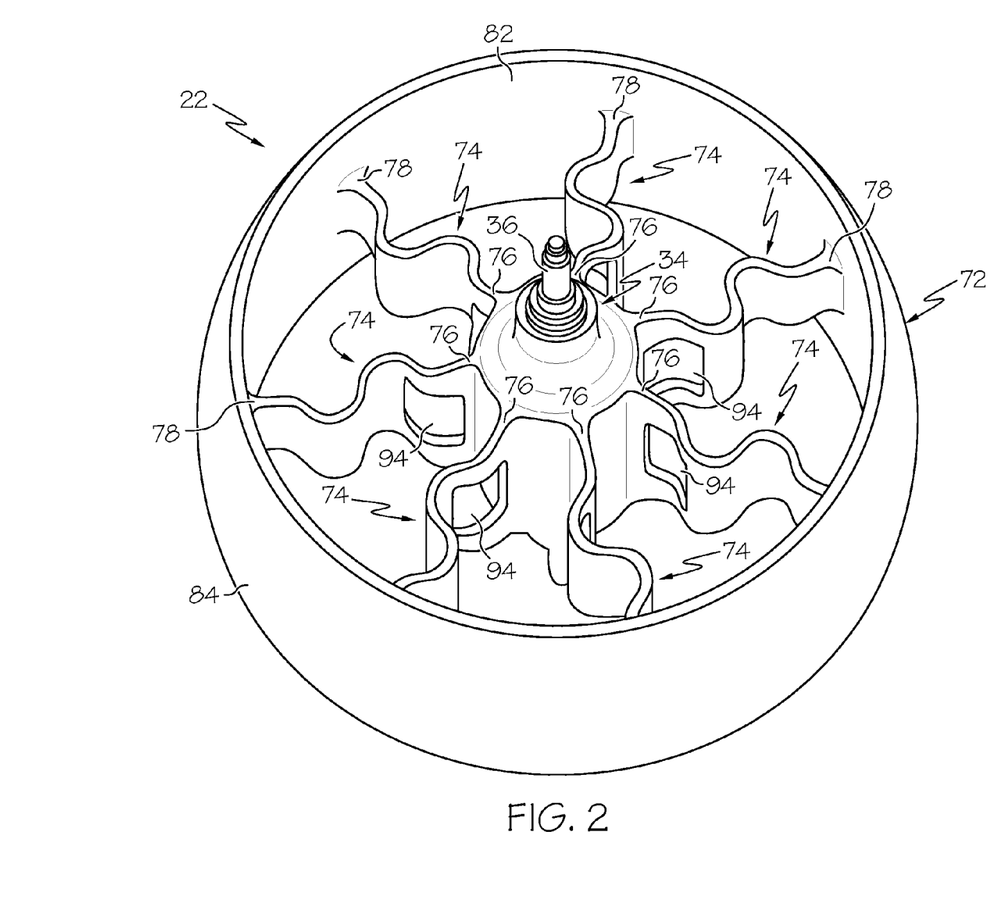
FIGS. 2 and 3 are isometric and top views, respectively, of the exemplary monolithic CMG rotor shown in FIG. 1.
Figure 3:
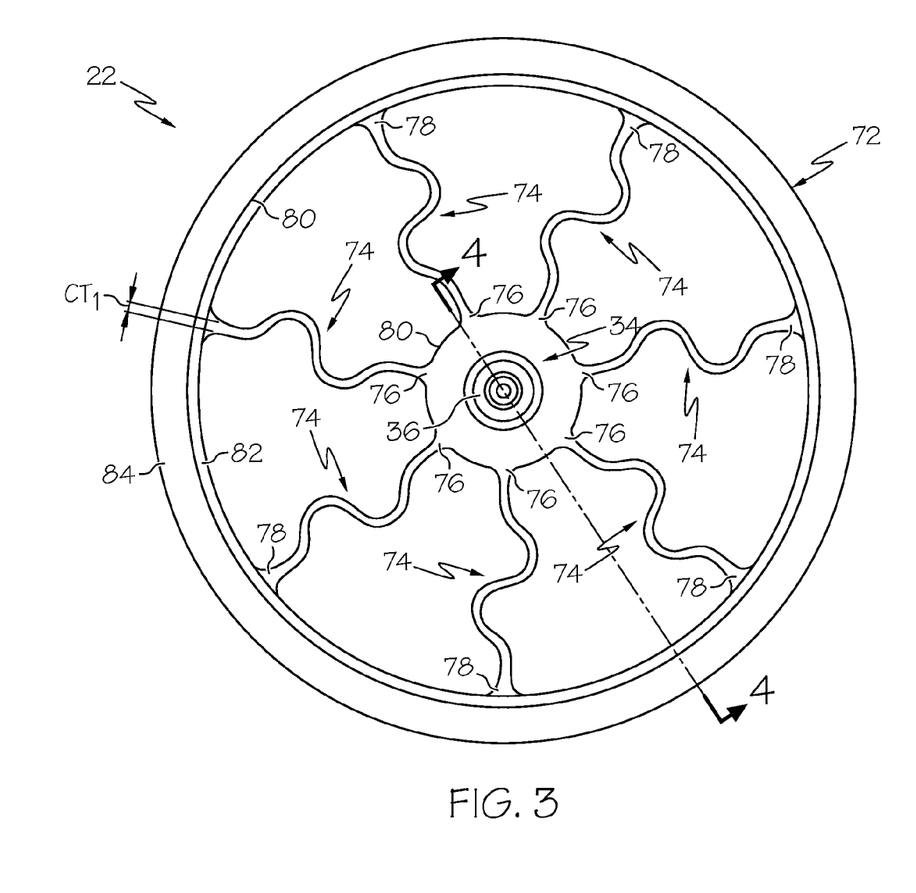

FIGS. 2 and 3 are isometric and top views, respectively, of monolithic CMG rotor 22. In addition to rotor shaft 34, monolithic CMG rotor 22 includes an inertial element or rotor rim 72 and a plurality of radially-extending spokes 74, which join rotor rim 72 to rotor shaft 34. Rotor spokes 74 extend along longitudinal axes generally residing in a plane containing gimbal axis 60 (identified in FIG. 1) and orthogonal to spin axis 52 (also identified in FIG. 1). Rotor spokes 74 are circumferentially- or angularly-spaced about spin axis 52 (FIG. 1) at substantially regular intervals; e.g., in the illustrate example wherein CMG rotor 22 includes seven rotor spokes, spokes 74 are spaced apart at intervals of approximately 51.4°. This example notwithstanding, it is emphasized that embodiments of monolithic CMG rotor 22 can include any practical number of spokes, whether the total number of spokes is even or odd. As briefly indicated above, and as described more fully below in conjunction with FIG. 4, rotor spokes 74 are each fabricated to have a relatively high torsional stress capability and a high torsional stiffness, as taken about an axis perpendicular to spin axis 52 (FIG. 1). At the same time, rotor spokes 74 are also fabricated such that each spoke 74 is relatively compliant or flexible, as taken in a radial direction from a location at which the spoke joins rotor shaft 34 to a location at which the spoke joins rotor rim 72. For these reason, radial spokes 74 may be referred to herein below as "torsionally-stiff, radially-compliant spokes 74" or, more simply "radially-compliant spokes 74."

Radially-compliant spokes 74 each include an inner spoke end 76 and an opposing outer spoke end 78. Each outer spoke end 78 is joined to rotor rim 72 along an inner circumferential surface 82 thereof. Conversely, each inner spoke end 76 is joined to an outer circumferential surface 80 of rotor shaft 34 (identified in FIG. 3). As shown in FIGS. 1-3, the intermediate or midsection of rotor shaft 34 may increase in outer diameter when moving toward its midsection to form an enlarged central hub region to which inner spoke ends 76 of spokes 74 are connected and, preferably, integrally joined. Such an enlarged central hub region stiffens rotor shaft 34. In further embodiments, rotor shaft 34 may not include such an enlarged central hub region and may, instead, have a relatively narrow outer diameter that remains constant over the length of the shaft body with the possible exclusion of the shaft ends, which will typically be machined to have stepped portions of varying diameters to accommodate one or more spin motors (e.g., spin motors 48 and 50 shown in FIG. 1), spin bearings (e.g., spin bearings 44 and 46 shown in FIG. 1), and other such CMG components. In either case, rotor shaft 34 may still be stiffened by the presence of the radial spokes. These examples notwithstanding, it is again emphasized that the particular dimensions and geometries of rotor shaft 34, rotor spokes 74, and rotor rim 72 will vary amongst different embodiments of CMG rotor 22.

Rotor rim 72 can assume the form of any structural element, grouping, or assemblage of structural elements suitable for usage as the primary inertial mass of CMG rotor 22. As indicated in FIGS. 1-3, rotor rim 72 will typically assume the form of an annular single-piece body or monolithic ring. In the illustrated example, rotor rim 72 includes an outer circumferential surface 84 having convex contour, as taken along a cut plane containing spin axis 52 (FIG. 1), which approximates the mid-region or equatorial band of a sphere to maximize the mass of rim 72 while providing CMG rotor 22 with a relatively compact envelope; however, the outer contours of rotor rim 72 may vary amongst embodiments, as will the relative dimensions of rim 72. In general, the outer diameter of rotor rim 72 will typically be determined by allowable stresses, operational rotor speeds, and rotor weight; while the inner diameter of rim 72 may be optimized to achieve a desired weight-to-momentum ratio. Increasing the radial thickness of rotor rim 72 will typically improve the torque capacity and momentum capabilities of monolithic CMG rotor 22, albeit with a corresponding weight penalty.

As previously stated, CMG rotor 22 is preferably manufactured as a monolithic or unitary body or mass. In such cases, and with reference to the exemplary embodiment shown in FIGS. 1-3, rotor shaft 34, rotor rim 72, and radially-compliant spokes 74 are integrally joined as a single piece. This may be more fully appreciated by referring to FIG. 4, which is a cross-sectional view of monolithic CMG rotor 22 (partially shown) taken along line 4-4 in FIG. 3. With the understanding that the precise boundaries between integrally-joined regions or sections of a monolithic or single-piece part are somewhat conceptual, dashed lines 88 are provided in FIG. 4 to visually distinguish the general boundaries or demarcation between rotor rim 72 and the outer terminal ends of radially-compliant spokes 74 (only one of which is fully shown in FIG. 4). Dashed lines 86 are further provided to visually distinguish the general demarcation between rotor shaft 34 and the inner terminal ends of radially-compliant spokes 74. The region at which the outer spoke end 78 of each radially-compliant spoke 74 is integrally connected to inner circumferential surface 82 of rotor rim 72 is referred to herein as the "rim-spoke joinder interface" and generally identified in FIG. 4 by circle 89. First and second circles generally identify first and second axially-spaced spoke-shaft joinder interfaces 90 and 92, respectively, along which opposing edge regions of inner spoke end 76 are joined to rotor shaft 34 (the edge regions of inner spoke end 76 being opposed as taken along the longitudinal axis of shaft 34 or spin axis 52 shown in FIG. 1).

As identified in FIG. 4, each radially-compliant spoke 74 has a predetermined length $L_1$, as taken along a radius of CMG rotor 22 extending from the location at which inner spoke end 76 connects to rotor shaft 34 (e.g., the spoke-shaft joinder interface(s) described below) to the location at which outer spoke end 78 connects to rotor rim 72 (e.g., spoke-rim joinder interface 89). In one embodiment, and by way of non-limiting example only, the spoke length $L_1$ is greater than about half the radius of monolithic CMG rotor 22 (identified in FIG. 4 as "$R_1$"). As further identified in FIG. 4 by double-headed arrow "$H_1$," outer spoke ends 78 are each fabricated to have a predetermined axial height. By way of non-limiting example, and as further indicated in FIGS. 1-4, the axial height ($H_1$) of each outer spoke end 78 may be less than or approximately equal to the axial height of rotor rim 72. However, in further embodiments, this dimension may be adjusted to, for example, fine tune the cross-axis stiffness of radially-compliant spokes 74.

Figure 4:
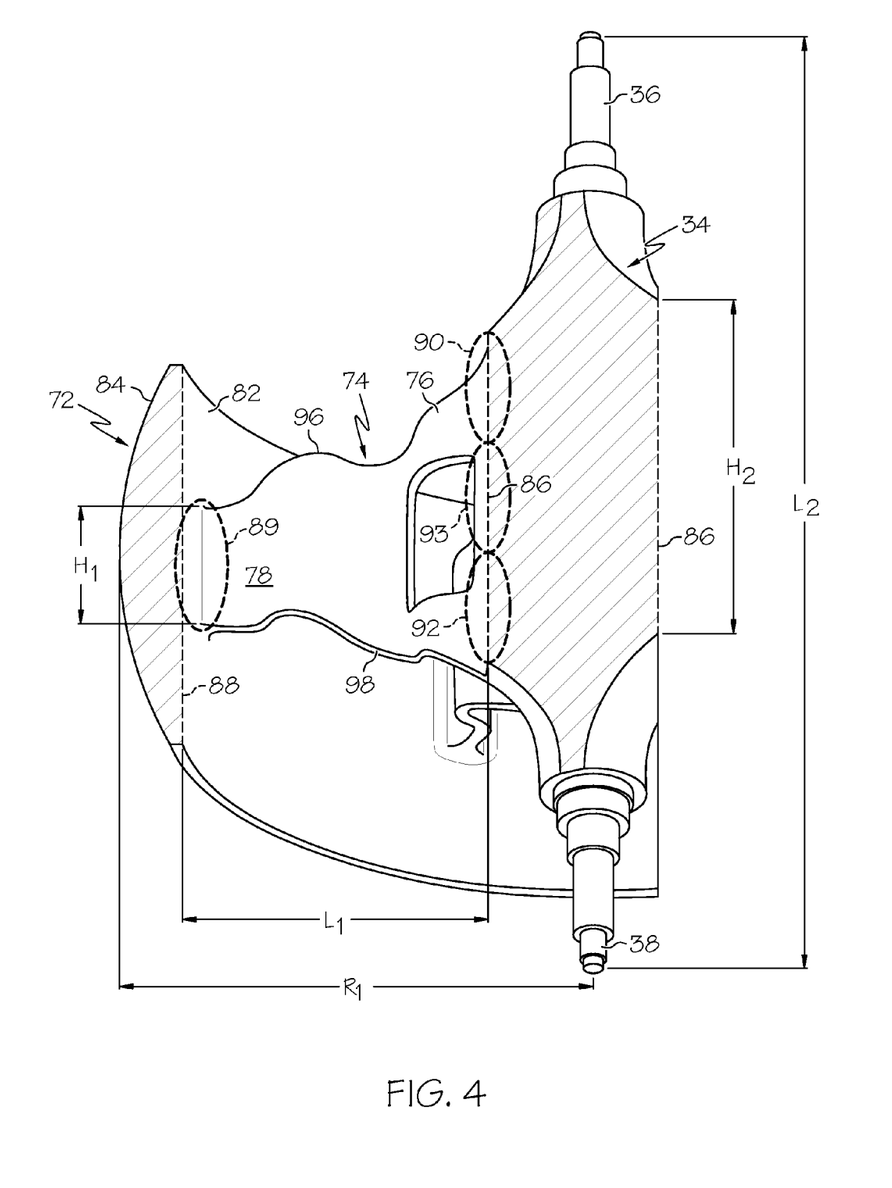
FIG. 4 is a cross-sectional view of a portion of the exemplary monolithic CMG rotor shown in FIGS. 1-3, as taken along line 4-4 in FIG. 3.

As indicated in FIG. 4 by circle 93, an intermediate portion of inner spoke end 76 likewise connects to an intermediate segment of rotor shaft 34 such that inner spoke end 76 is integrally joined to rotor shaft 34 along the entire shaft height. It should be noted, however, that the below-described high torsional stiffness properties of rotor spokes 78 are provided, at least in large part, by the relatively wide stance of the opposing edge regions of inner spoke ends 76 and, specifically, by increased the axial spacing between spoke-shaft joinder interfaces 90 and 92. In further embodiments of CMG rotor 22, intermediate spoke-shaft joinder interface 93 may be removed, in part or in its entirety, to provide additional mass reduction such that each rotor spoke 78 is joined to rotor shaft 34 solely by opposed spoke-shaft joinder interfaces 90 and 92. By forming spoke-shaft joinder interfaces 90 and 92 to have an increased axial spacing in this manner, the axial height of inner spoke end 76 (identified in FIG. 4 as "$H_2$") is increased to enhance the angular stiffness of each rotor spoke 74. In certain implementations, each rotor spoke 74 may be fabricated such that its inner spoke end 76 has an axial height ($H_2$) that is closer in magnitude to the length ($L_2$) of rotor shaft 34 than to the height ($H_1$) of its outer spoke end 78. In other implementations, each inner spoke end 76 may have an axial height ($H_2$) approximately equivalent to (that is, differs by no more than about 10% as compared to) the radius ($R_1$) of monolithic CMG rotor 22 (identified in FIG. 4 as "$R_1$"). Generally, the maximum height of inner spoke end 76 ($H_2$) will be greater than, and is preferably at least twice, the maximum height ($H_1$) of outer spoke end 78.

With continued reference to FIG. 4, radially-compliant spokes 74 each include opposing longitudinal ridges or spines 96 and 98. As each radially-compliant spoke 74 increases in axial height when moving radially inward from outer spoke end 78 to inner spoke end 76 (i.e., when moving toward spin axis 52 shown in FIG. 1), spines 96 and 98 diverge from one another and from gimbal axis 60 (FIG. 1) with increasing proximity to rotor shaft 34 in the illustrated example. Radially-compliant spokes 74 are preferably fabricated to each have an axially-tapered geometry, which provides a gradual or non-stepped increase in axial height when moving along the spoke length or body in a radially outward direction; although the possible of fabricating spokes 74 to have an axially-stepped contour is by no means excluded. For example, opposing longitudinal ridges or spines 96 and 98 of each radially-compliant spoke 74 may each be imparted with a generally arc-shaped, sloped, or parabolic contour. Such an axially-tapered design reduces hub stresses during high speed CMG operation and allows spoke spines 96 and 98 to generally function as constant stress beams.

The weight of CMG rotor 22 can be further reduced with little impact on spoke torsional stiffness by fabricating each rotor spoke 74 to have a relatively narrow transverse or chordal thickness (identified in FIG. 3 as "$CT_1$"); e.g., in certain embodiments and by way of non-limiting example, each rotor spoke 74 may be fabricated such that the maximum axial height ($H_1$) of each outer spoke end 78 is at least twice the radial spoke chordal thickness ($CT_1$), such that the average axial height of each rotor spoke 74 is at least twice the radial spoke chordal thickness ($CT_1$), and such that the maximum axial height ($H_2$) of each inner spoke end 76 is at least four times the radial spoke chordal thickness ($CT_1$). While spokes 74 have substantially constant chordal thicknesses (identified as "$CT_1$" in FIG. 3) along their lengths or bodies in the illustrated example, it should be noted that the chordal thicknesses of radially-compliant spokes 74 may vary along the spoke length in alternative embodiments; e.g., in certain implementations, the chordal thickness of each radial spoke may be tapered in much the same manner as is the spoke height such that the chordal thickness gradually increases with increasing proximity to rotor shaft 34 and to spin axis 52 (FIG. 1).

One or more concavities may be formed within each rotor spoke 74 and/or one or more transverse openings may be formed through each rotor spoke 74 to further reduce spoke mass. For example, as shown in FIGS. 2 and 4 (and omitted from FIG. 1), a lightening hole or window 94 may be cut through or otherwise formed in the body of each rotor spoke 74. Each transverse window 94 is preferably formed through an intermediate portion of rotor spoke 74 and does not breach either of opposing spines 96 and 98 (labeled in FIG. 4) to maintain the angular spoke stiffness. While illustrated as having a generally rectangular planform geometry in the exemplary embodiment shown in FIGS. 2 and 4, each window 94 may assume various other shapes (e.g., rounded geometries) in further embodiments of CMG rotor 22.

By maximizing the height ($H_2$) of inner spoke end 76 relative to the length ($L_1$) of rotor shaft 34 in the above-described manner, and thereby moving spoke-shaft joinder interfaces 90 and 92 toward the opposing terminal ends of rotor shaft 34, the angular or torsional stiffnesses of rotor spokes 74 can be improved. Such a high torsional spoke stiffness allows monolithic CMG rotor 22 to be rotated at exceptionally rapid rotational rates while remaining highly responsive to torque applied by torque motor 58 and, therefore, highly controllable. In addition to having a relatively high torsional stiffness, each radially-compliant spoke 74 is also fabricated to include a tensile strain relief feature, which may be, for example, a curved or non-linear section of the spoke body, as viewed along the rotor spin axis. In the case of exemplary CMG rotor 22, specifically, each spoke 74 is fabricated to have a curved spoke segment 99, which serves as a tensile strain relief feature. In certain cases, curved spoke segment 99 may have a generally C-shaped or parabolic geometry. Alternatively, curved spoke segment 99 may have an undulating, wavy, or serpentine geometry, as viewed along spin axis 52 (FIG. 1); e.g., as shown in FIGS. 1-4, each spoke segment 99 may follow a generally S-shaped path, when moving from inner spoke end 76 toward outer spoke end 78. As a result of this structural configuration, curved segment 99 of radially-compliant spokes 74 can straighten-out by bending deflection, and thus increase its radial length, during high speed rotation of CMG rotor 22; the term "radial length," as appearing herein," denoting the length of a rotor spoke, as taken along a radius of a CMG rotor (e.g., CMG rotor 22) from a location at which the rotor spoke joins to the rotor shaft to a location at which the rotor spoke joins to the rotor rim.

When CMG rotor 22 is brought to its operational speed, rotor rim 72 may tend to expand radially outward more quickly than do rotor spokes 74. In contrast to conventional CMG rotors having straight or linear rotor spokes, this increases spoke stress and limits rotor speed, which, in turn, limits the momentum capabilities of the rotor. Thus, by curving the rotor spokes or otherwise fabricating spokes 74 to include tensile strain relief features of the type described herein (e.g., curved segments 99 shown in FIGS. 1-4), radially-compliant spokes 74 are permitted to expand radially in conjunction with outward radial growth of rim 72 to minimize tensile spokes stress while inducing only small values of bending stress. In this manner, the CMG rotor may be operated at or near the stress-limited speed of the rotor without undue restriction by the stress limits of the rotor spokes.

Figure 6:
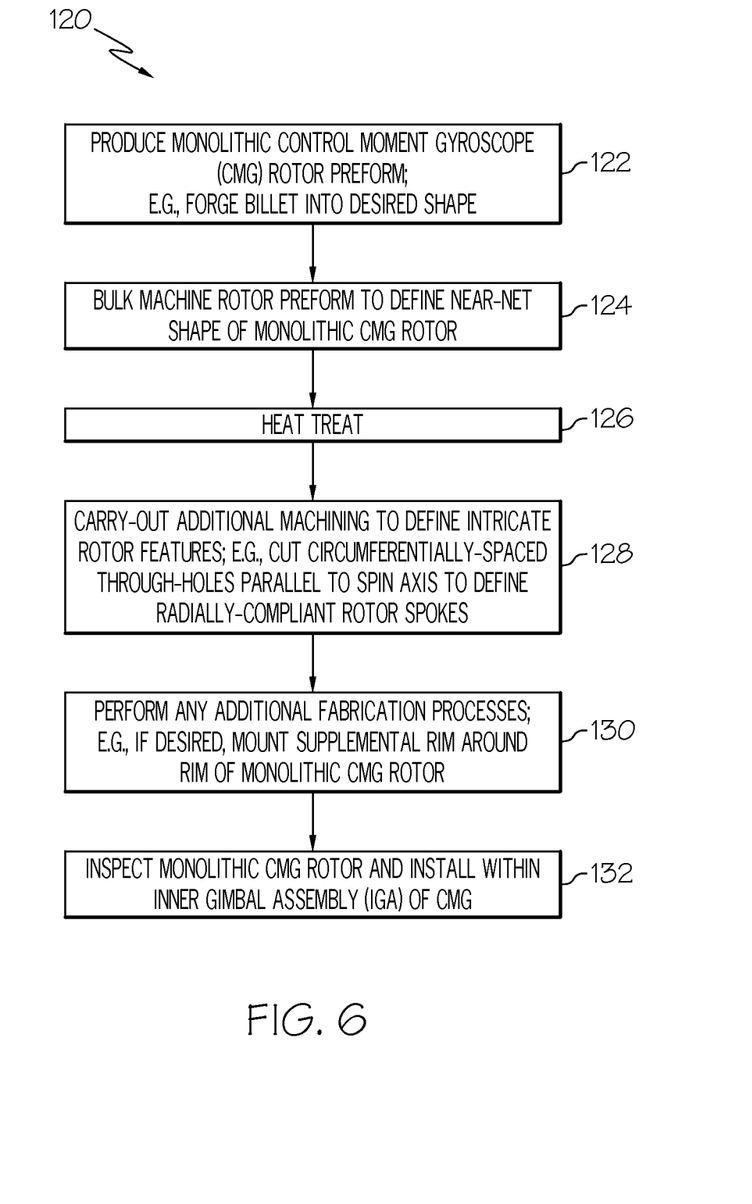
FIG. 6 is a flowchart illustrating an exemplary method for manufacturing a control moment gyroscope including a monolithic CMG rotor, such as the monolithic CMG rotor shown in FIGS. 1-4 or the monolithic CMG rotor shown in FIG. 5.

While in the exemplary embodiment described above in conjunction with FIGS. 1-4, the strain relief features assume the form of undulating regions of the spoke bodies, the tensile strain relief features may assume other forms in alternative embodiments. For example, in further embodiments, the tensile strain relief features may be implemented as other types of curved or non-linear segments of the elongated spoke bodies, as viewed along the rotor's spin axis, such as annular (that is, ring-shaped or circular), forked, or bi-furcated sections of the spoke bodies. Further illustrating this point, FIG. 6 is an isometric view of a CMG rotor 100 and a supplemental rim 101, which is mounted around CMG rotor 100 to produce a rotor assembly 100, 102. In many respects CMG rotor 100 is similar to CMG rotor 22 described above in conjunction with FIGS. 1-4. As was the case previously, CMG rotor 100 includes a rotor shaft 104, a rotor rim 106, and a plurality of circumferentially-spaced spokes 108 joining rotor shaft 104 to rotor rim 106. Rotor spokes 74 each include an inner end 110, which is joined to an outer circumferential surface of rotor shaft 104; an opposing outer end 112, which is joined to an inner circumferential surface of rotor rim 104; and an intermediate portion or midsection 114, which is disposed between inner shaft end 110 and outer spoke end 112. CMG rotor 100 is preferably fabricated as monolithic body such that rotor spokes 108, rotor shaft 104, and rotor rim 106 are integrally joined as a unitary piece; however, this need not be the case in all embodiments.

As are radially-compliant spokes 74 of CMG rotor 22 described above in conjunction with FIGS. 1-4, rotor spokes 108 of CMG rotor 100 are each preferably imparted with a relatively high torsional stiffness by, for example, fabricating each spoke 108 to have an axial height that increases gradually when moving radially inward from rotor rim 106 toward rotor shaft 104. Additionally, rotor spokes 108 of CMG rotor 100 are again fabricated to include one or more tensile strain relief features to impart each spoke 108 with a predetermined radial compliancy. However, in contrast to CMG rotor 22 (FIGS. 1-4), the strain relief features of CMG rotor 100 are implemented as bifurcated midsections 114 of each rotor spoke 108, as view along the rotor spin axis. As each spoke midsection 114 extends outward from inner spoke end 110, each spoke midsection 114 diverges into two curved or bowed legs, which extend in a side-by-side relationship for a distance until again converging into outer spoke end 112. The bowed legs of the bifurcated midsections 114 are defined, in part, by axial openings 116 formed through each midsection 114 along axes substantially parallel with the spin axis of CMG rotor 100. During high speed operation of CMG rotor 100, bifurcated spoke midsections 114 deflect by bending such that the bowed legs converge and the radial length of each radial spokes 108 increases to accommodate the outward expansion of rotor rim 106 in the above-described manner. In further embodiments, spoke midsections 114 may be enlarged and the contour of the bowed legs of each midsection 114 may be altered (e.g., each leg may follow a generally semicircular contour, as viewed along the rotor spin axis) to impart each radially-compliant spoke with a generally ring-shaped or annular geometry. In such cases, radially-compliant spokes are still considered to include a bifurcated spoke section in the context of the present Application.

Figure 5:
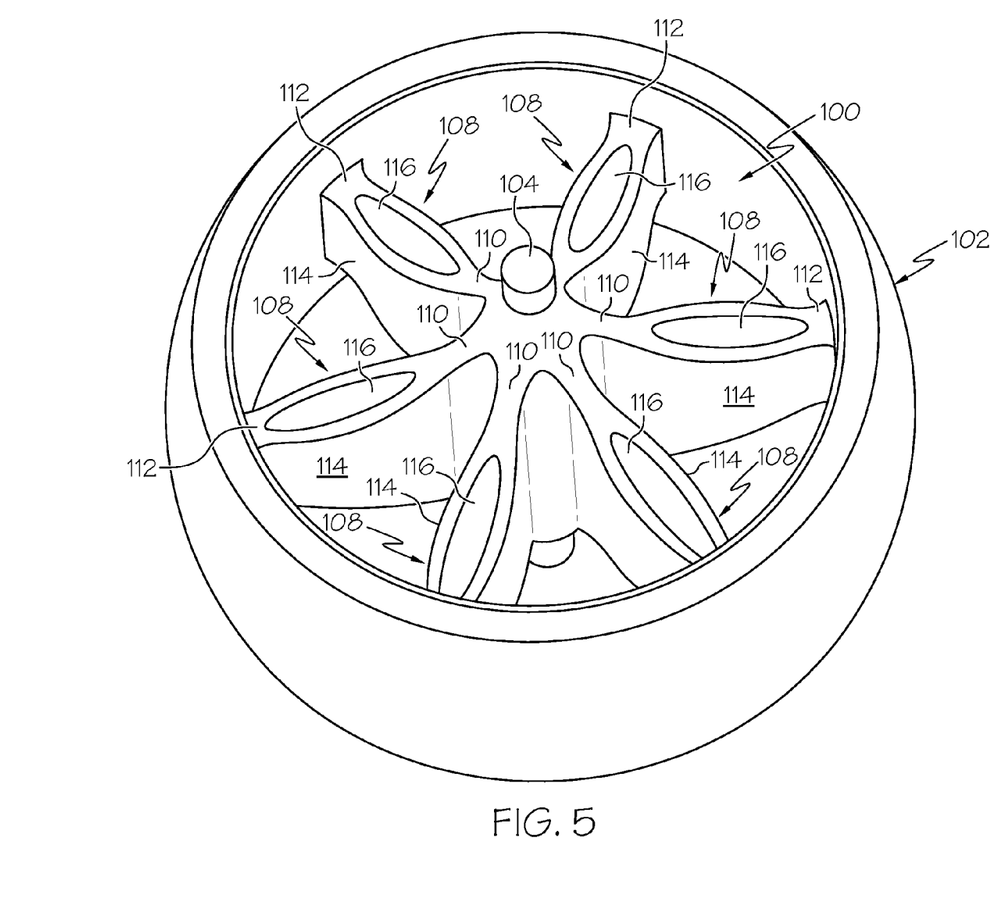
FIG. 5 is an isometric view of an exemplary monolithic rotor including a plurality of radially-compliant spokes, as illustrated in accordance with a further exemplary embodiment of the present invention.

With continued reference to FIG. 5, supplemental rim 102 is affixed around rotor rim 106 during production of rotor assembly 100, 102. In a first example, supplemental rim 102 may be fabricated from a metal or alloy (e.g., a steel) as a one piece ring, which is mounted around rotor rim 106 utilizing an interference- or thermal-fit process. Alternatively, supplemental rim 102 can be fabricated from a composite material, such as a carbon fiber-composite, having a higher modulus than does the parent material from which CMG rotor 100 is fabricated. In this case, supplemental rim 102 may be either pre-cured separately from CMG rotor 100 and then installed around rotor rim 106 or, instead, wrapped around rim 106 when in a malleable, pre-cured or green state and subsequently cured during manufacturing. In such cases, CMG rotor 100 may still be characterized by a monolithic construction when the structural elements of rotor 100 (i.e., rotor rim 106, rotor spokes 108, and rotor shaft 104) are integrally formed as a unitary body or single piece. By mounting such a supplemental rim around monolithic CMG rotor 100, supplemental rim 102 reduces operating stresses by placing rotor rim 106 and rotor spokes 108 in compression and/or by reinforcing the hoop strength of rotor rim 106. This, in turn, allows production of rotor assembly having improved operating stress capabilities, while still lacking weld joints that could otherwise undesirably limit rotational speeds and rotor lifespan. CMG rotor 22 shown in FIGS. 1-4 in can also be combined with a supplemental rim to yield a rotor assembly in further embodiments of the present invention.

FIG. 6 is a flowchart illustrating an exemplary method 120 for manufacturing a control moment gyroscope including a monolithic CMG rotor, such as CMG rotor 22 described above in conjunction with FIGS. 1-4 or CMG rotor 100 described above in conjunction with FIG. 5. Exemplary method 120 commences with the step of producing a monolithic or one piece CMG rotor preform (STEP 122). In one embodiment, the monolithic rotor preform is fabricated by forging a single billet into a desired bulk shape, such as cylinder. The billet is preferably composed of a relatively dense alloy having high tensile and yield strengths, having moderate to good ductility, and having low life cycle fatigue properties. Suitable materials include, but are not limited, to high strength steels. Next, at STEP 124, the forging or one piece CMG rotor preform undergoes bulk machining during which large portions of the billet are removed to define the near-net shape of the finished monolithic CMG rotor. For example, during bulk machining, the upper and lower regions of the one piece CMG rotor preform may be removed to define the upper and lower ends of the rotor shaft, and the outer circumference of the CMG rotor preform may be rounded to define the outer geometry of the rotor rim. Heat treatment may then be carried-out (STEP 126), which may entail a hot isostatic pressing ("HIP") process and possibly one or more additional high temperature treatment steps.

Continuing with exemplary method 120 (FIG. 6), further machining of the near-net rotor preform may next be performed to define the more intricate features of the CMG rotor (STEP 128). For example, and with reference to CMG rotor 22 shown in FIGS. 1-4 and to CMG rotor 100 shown in FIG. 5, circumferentially-spaced through holes may be cut through the body of the rotor preform along axes substantially parallel to the spin axis to define the lateral sidewalls of the plurality of radially-compliant radial spokes. In this manner, the plurality of radially-compliant radial spokes can be fabricated to each include an inner spoke end integrally joined to the rotor shaft and an outer spoke end integrally joined to an inner circumferential surface of the rotor rim. The radial spokes are advantageously fabricated to include tensile strain relief features suitable for imparting each spoke with a predetermined radial compliancy or flexibility, as taken from a location at which the spoke joins to the rotor shaft to a location at which the spoke joins the rotor rim. By way of non-limiting example, the tensile strain features can be undulating sections of the spoke bodies, as described above in conjunction with FIGS. 1-4; generally circular, annular, or bifurcated sections of the spoke bodies, such as those as described above in conjunction with FIG. 5; or a combination thereof. The radial spokes are also advantageously fabricated to have a tapered axial height, which increases gradually with increasing proximity to the rotor shaft as previously described; and/or a tapered chordal thickness, which likewise increases with increasing proximity to the rotor shaft.

Next, at STEP 130 (FIG. 6), one or more additional fabrication steps may be performed to complete fabrication of the monolithic CMG rotor, if needed. For example, in certain embodiments, a supplemental rim (e.g., a steel ring) may be mounted around the rim of the monolithic CMG rotor utilizing a thermal- or interference-fit, as noted above in conjunction with FIG. 5. The supplemental rim may also be fabricated from a composite material, which is either pre-cured and then installed around the rotor rim or, instead, wrapped around the rim of the monolithic CMG rotor in a green, pre-cured state and then cured in place during STEP 130. To conclude exemplary method 120 (FIG. 6), the CMG rotor may be inspected and installed within the inner gimbal assembly of its host CMG (STEP 132). In one embodiment, inspection may entail a characterization process during which the CMG rotor is examined for structural defects utilizing X-ray radiography or another inspection technique. By fabricating CMG rotor 22 and/or CMG rotor 100 from a one piece preform (or a single forged billet) in the above-described manner, and thus eliminating the need for welding or otherwise joining multiple separately-fabricated components, the time and costs associated with manufacture of CMG rotor 22 and/or CMG rotor 100 can be significantly reduced as compared to the manufacture of shell rotors and other conventionally-known multi-piece rotors.

In view of the above, it should be appreciated that multiple exemplary embodiments of a control moment gyroscope including advanced rotors having improved performance characteristics (e.g., increased momentum-per-weight ratios, higher speed limits, longer operational lifespans, and so on) as compared to shell rotor assemblies and other conventionally-known CMG rotor assemblies. Embodiments of the above-described CMG employed monolithic CMG rotors, which are amenable to production utilizing cost effective and time efficient manufacturing processes. Notably, the above-described CMGs included CMG rotors having radially-compliant spokes, which deflect by bending action to increase in radial length during high speed rotor rotation and thereby alleviate spin stress enabling more efficient, higher speed CMG rotor designs. In preferred embodiments, the radially-compliant spokes were fabricated to each include at least one tensile strain relief feature enabling the spoke to lengthen due, at least in substantial part, to bending deflection of strain relief feature during high speed rotation of the CMG rotor to accommodate radial expansion of the rotor rim and thereby reduce spin stresses along the spoke bodies and at the joinder interfaces at which the rotor spokes connect to the rotor rim and shaft. The foregoing has also provided manufacturing processes suitable for producing CMGs including such high performance rotors.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A control moment gyroscope (CMG), comprising: a stator housing; an inner gimbal assembly (IGA), comprising: an IGA housing rotatably mounted to the stator housing; a CMG rotor rotatably mounted to the IGA housing, the CMG rotor comprising: a rotor shaft having a length; a rotor rim circumscribing the rotor shaft; and a plurality of radially-compliant spokes extending between the rotor shaft and the rotor rim, each radially-compliant spoke including an outer spoke end and an inner spoke end, the inner spoke end having an axial height that is closer to the length of the rotor shaft than to the axial height of the outer spoke end; wherein the plurality of radially-compliant spokes are integrally formed with the rotor shaft and the rotor rim as a single machined piece; and a spin motor coupled to the IGA housing and configured to rotate the CMG rotor about a spin axis; and a torque motor coupled to the stator housing and configured to rotate the IGA housing about a gimbal axis to generate a desired output torque during operation of the CMG.

2. A CMG according to claim 1 wherein at least a portion of each of the plurality of radially-compliant spokes is curved, as viewed along the spin axis.

3. A CMG according to claim 1 wherein each of the plurality of radially-compliant spokes comprises a tensile strain relief feature.

4. A CMG according to claim 3 wherein the tensile strain relief feature is integrally formed with the spoke body.

5. A CMG according to claim 4 wherein the tensile strain relief features comprises an undulating portion of the spoke body.

6. A CMG according to claim 4 wherein the tensile strain relief feature comprises a bifurcated portion of the spoke body, as viewed along the spin axis.

7. A CMG according to claim 4 wherein the tensile strain relief feature is defined, at least in part, by an opening formed through the rotor spoke along an axis substantially parallel to the spin axis.

8. A CMG according to claim 3 wherein each of the plurality of radially-compliant spokes further comprises:
an inner spoke end integrally joined to the rotor shaft; and
an outer spoke end integrally joined to the rotor rim, the tensile strain relief feature disposed between the inner spoke end and the outer spoke end.

9. A CMG according to claim 8 wherein the axial height of each radially-compliant spoke increases gradually when moving in a radially inward direction from the outer spoke end toward the inner spoke end.

10. A CMG according to claim 1 further comprising a supplemental rim mounted around the rotor rim.

11. A control moment gyroscope (CMG), comprising:
a stator housing;

an inner gimbal assembly (IGA), comprising:
   an IGA housing rotatably mounted to the stator housing;
   a CMG rotor rotatably mounted to the IGA housing, the CMG rotor comprising:
      a rotor shaft;
      a rotor rim disposed around the rotor shaft;
      a plurality of radial spokes having spoke bodies extending between the rotor shaft and the rotor rim; and
      a plurality of tensile strain relief features integrally formed with plurality of radial spokes and imparting each of the plurality of radial spokes with a predetermined radial compliancy, the plurality of tensile strain relief features comprising curved portions of the spoke bodies integrally joined to an inner circumferential surface of the rotor rim;
   a spin motor coupled to the IGA housing and configured to rotate the CMG rotor about a spin axis; and
   a torque motor coupled to the stator housing and configured to rotate the IGA housing about a gimbal axis perpendicular to the spin axis.

12. A CMG according to claim 11 wherein the plurality of tensile strain relief features are selected from the group consisting of undulating segments of the spoke bodies and bifurcated segments of the spoke bodies, as viewed along the spin axis.

13. A method for manufacturing a control moment gyroscope (CMG), the method comprising:
   producing a monolithic CMG rotor, comprising:
      a rotor shaft;
      a rotor rim circumscribing the rotor shaft; and
      a plurality of radially-compliant spokes extending between the rotor shaft and the rotor rim;
   installing the monolithic CMG rotor within an inner gimbal assembly (IGA) including an IGA housing and a spin motor configured to rotate the monolithic CMG rotor relative to the IGA housing about a spin axis; and
   mounting the IGA to a stator assembly including a stator assembly housing and a torque motor configured to selectively rotate the IGA about a gimbal axis to selectively generate a desired output torque during operation of the CMG;
   wherein producing comprises:
      providing a one piece rotor preform; and
      cutting openings through the body of the one piece rotor preform along axes substantially parallel to the spin axis to define the plurality of radially-compliant spokes and to impart each spoke with a tensile relief feature integrally formed with the rotor shaft and with the rotor rim.

14. A method according to claim 13 wherein the step of forming comprises forming each of the plurality of radially-compliant spokes to have a curved section, as viewed along the spin axis.

15. A method according to claim 13 wherein the step of forming comprises forming each of the plurality of radially-compliant spokes to include a bifurcated section, as viewed along the spin axis.

16. A CMG according to claim 1 wherein the axial height of each inner spoke end is approximately equivalent to a radius of the CMG rotor.

17. A CMG according to claim 11 wherein the plurality of tensile strain relief features comprise S-shaped sections of the spoke bodies integrally joined to the rotor rim.

18. A CMG according to claim 11 wherein the plurality of tensile strain relief features comprise bifurcated midsections of the spoke bodies, each bifurcated midsection including bowed legs that converge while bending during rotation of the monolithic CMG rotor to allow the plurality of radially compliant spokes to lengthen.

19. A CMG according to claim 11 wherein the plurality of radial spokes each include an inner spoke end having an axial height approximately equivalent to a radius of the CMG rotor.

* * * * *